United States Patent [19]

Campbell

[11] Patent Number: 4,800,719
[45] Date of Patent: Jan. 31, 1989

[54] EXHAUST SYSTEM

[76] Inventor: Monty A. Campbell, 3701 NW. 56th St., Kansas City, Mo. 64151

[21] Appl. No.: 107,870

[22] Filed: Oct. 8, 1987

Related U.S. Application Data

[63] Continuation of Ser. No. 769,995, Aug. 26, 1985, abandoned, which is a continuation of Ser. No. 461,863, Jan. 28, 1983, abandoned.

[51] Int. Cl.$^4$ ............................................. F02B 27/02
[52] U.S. Cl. ...................................... 60/313; 60/323; 181/266; 181/269
[58] Field of Search ................. 60/313, 323; 181/269, 181/266

[56] References Cited

U.S. PATENT DOCUMENTS

| | | |
|---|---|---|
| 1,413,351 | 4/1922 | Peters . |
| 2,239,549 | 4/1941 | Chipley ............................. 181/269 |
| 2,692,025 | 10/1954 | Maxim . |
| 2,940,249 | 6/1960 | Gospodar . |
| 3,070,187 | 12/1962 | Deremer . |
| 3,072,214 | 1/1963 | Deremer . |
| 3,786,890 | 1/1974 | Shank . |
| 3,827,529 | 8/1974 | Frietzsche et al. . |
| 3,949,829 | 4/1976 | Honda et al. . |
| 4,197,704 | 4/1980 | Date ..................................... 60/313 |
| 4,327,811 | 5/1982 | Isaka . |
| 4,359,865 | 11/1982 | Nakao ................................. 60/313 |

FOREIGN PATENT DOCUMENTS 860897 10/1940 France ................................. 60/313

Primary Examiner—Douglas Hart
Attorney, Agent, or Firm—Litman, McMahon & Brown

[57] ABSTRACT

An exhaust system is provided for internal combustion engines which relatively improves the performance of such engines. The system comprises a plurality of approximately equal length exhaust pipes which are operably flow connected to exhaust ports of the engine at one end thereof and to a collection chamber at an opposite end thereof. The system further includes discharge pipes which communicate between ambient atmosphere and the collection chamber. The exhaust pipes are grouped in sets such that each of the pipes in the set is generally axially aligned with one of the discharge pipes. The collection chamber has a cross-sectional area which is greater than the cross-sectional area of the exhaust pipes where they are attached thereto and converges to a smaller cross section at the opposite end thereof where the discharge pipes are attached thereto. The discharge pipes diverge away from the collection chamber and include a silencing device in the discharge ends thereof. The silencing devices include a deflection mechanism which diverts approximately one-half of the discharge gasses passing through the discharge pipes to an elongated pathway so as to travel further than the remaining gas flow before rejoining the remainder of the gas, such that vibrations within the two gas streams interfere with one another thereby reducing the noise level produced by the gas being expelled from the discharge pipes.

14 Claims, 2 Drawing Sheets

EXHAUST SYSTEM

This is a continuation of application Ser. No. 769,995, filed Aug. 26, 1985, now abandoned, which is a continuation of application Ser. No. 461,863, filed on Jan. 28, 1983, and now abandoned.

BACKGROUND OF THE INVENTION

The present invention relates to exhaust systems, in particular to an exhaust system wherein scavenging occurs, especially in combination with silencing.

In internal combustion engines it is quite common for two or more of the exhaust valves of various cylinders to be open at the same time. Normally, the exhaust gas pressure in the cylinders with exhaust valves open at the same time will not be the same. For example, for one cylinder the exhaust port may have just opened and the exhaust gasses within the cylinder are at a relatively high pressure, whereas simultaneously the exhaust valve for another cylinder may have been open for some time such that most of the gasses within the cylinder have escaped and the valve has started to close. If the gasses escaping from these various cylinders are all vented into the same exhaust manifold, it is quite possible, due to poor engineering, that the exhaust gasses from the cylinder where the valve has just opened may at least partially repressurize the cylinder where the valve is just about to close with exhaust gasses thereby substantially decreasing the efficiency of the engine.

Over the years various exhaust configurations have been designed in attempts to alleviate the above mentioned problem and thereby increase the efficiency of the engine. For instance, exhaust gasses from cylinders which would have exhaust valves open at the same time were vented into separate exhaust manifolds. However, higher efficiency has been obtained when, through proper design, the exhaust gasses escaping at high pressure from one cylinder are utilized to draw exhaust gasses from a cylinder at relatively low pressure before the exhaust valve of the latter closed. This operation and related operations are generally referred to as "scavenging".

In theory, the performance (as used herein—the relative horsepower at any given rate of revolution of the engine) can be improved by decreasing the amount of exhaust gasses remaining in a cylinder prior to intake of fresh fuel. It is desirable that the fuel-air mixture which is combusted in each succeeding fuel-air burn in a cylinder contain a minimal amount of the burnt fuel-air mixture of the preceeding combustion. When it is not possible to have only a given fuel-air mixture in the cylinder, it is preferred that fresh ambient air be included therewith, rather than exhausted gasses from a previous combustion. Therefore, the function of the present invention is to reduce the amount of residual combusted gasses in a cylinder for the succeeding burn as much as possible.

It is also important in exhaust systems of this type to limit the amount of noise produced by the escape of gasses from the end of the exhaust system into the ambient atmosphere. Various types of silencing devices have been developed over the years which use different techniques to deaden the noise escaping from the exhaust system utilizing same. It is possible to lower or dampen the amount of noise emitted by a vibrating or oscillating material by combining that material with a similar material which is vibrating 180° out of phase with the first material such that the vibrations in the two materials in effect cancel each other. It is desirable that a silencing system utilizing such resonance dampening be available for use in conjunction with the above mentioned exhaust system and, in particular a silencer which does not substantially impair the increased efficiency produced by the exhaust system.

OBJECTS OF THE INVENTION

Therefore the objects of the present invention are as follows: to provide an exhaust system for an internal combustion engine which improves the performance of the engine over conventional exhaust systems; to provide such a system which is highly effective in scavenging exhaust gasses from cylinders of the engine; to provide such a system which decreases the relative amount of exhaust gasses and increases the relative amount of fuel to fresh air in a mixture within such a cylinder prior to combustion; to provide such a system which includes a silencer device; to provide such a silencer device which utilizes resonance deadening principles to decrease the noise emitted by the system; to provide such a system which is relatively simple and easily reparable; to provide such a system which is relatively inexpensive to manufacture, easy to install, and particularly well adapted for the intended usage thereof.

Other objects and advantages of this invention will become apparent from the following description taken in conjunction with the accompanying drawings wherein are set forth, by way of illustration and example, certain embodiments of this invention.

SUMMARY OF THE INVENTION

An exhaust system is provided for an internal combustion engine, especially a high performance motorcycle engine or the like. The exhaust system comprises a plurality of exhaust tubes or pipes each of which is connected at one end to an exhaust port of the engine. As used herein the term "exhaust pipe" refers to the part of the exhaust system nearest the engine. A second end of each exhaust pipe is connected to a collector chamber defined by structure means comprising suitable surrounding walls. Further, a discharge pipe is connected at one end thereof to the collector chamber and discharges at a second end thereof into the ambient atmosphere. Flow communication means, preferably a second discharge pipe provides for flow of gas between the chamber and the atmosphere. As used herein, the term "discharge pipe" refers to that part of the exhaust system prior to where the gas passes into the ambient atmosphere.

Preferably, each of the exhaust pipes is of substantially equal length. Also the exhaust pipes are connected to a first end of the collector chamber and the discharge pipes are connected to a second end of the collector chamber opposite the first end thereof. Further, the exhaust pipes are arranged in sets of one or more such that the pipes of each set are generally coaxially aligned with one of the discharge pipes. It is obviously impossible to exactly coaxially align multiple and generally parallel exhaust pipes when they are included in the set with a single discharge pipe and it has been found that only a relatively close alignment is required for operation of the device as described herein. Therefore, the term "generally aligned" as used herein does not mean exactly aligned but rather aligned so that the momentum of gasses flowing through one exhaust pipe generally directs the gasses into the associated discharge pipe.

In addition, preferably the generally aligned axis discussed above joining associated exhaust pipes and discharge pipes crosses within a plane similar axes associated with other exhaust pipes and discharge pipes within the collector chamber.

The collector chamber is also preferably tapered or converging from the first side thereof where same joins with the exhaust pipes to the opposite side thereof where same joins with the discharge pipes. Also, the discharge pipes diverge outwardly from their juncture with the collector to the outer end thereof preferably in a ratio of approximately 3 to 5 length units at the opposite ends thereof when the sidewalls of the discharge pipes are diverged at an angle of approximately 3° with respect to the central axis of the discharge pipe. Discharge pipes are therefore shaped similar to a megaphone. In this manner the lateral or transverse cross-sectional area of the collector chamber is substantially larger than any of the exhaust pipes near the first end thereof and is substantially narrowed in cross-sectional area near the second end thereof with respect to the first end. The discharge pipes not only open into the ambient atmosphere and, therefore, allow a gas stream to diverge substantially at that point, but also diverge along the length thereof. In this manner, a venturi-like configuration is formed within the system.

A particularly effective configuration of the exhaust system has been employed with a four cylinder motorcycle engine, although it is foreseen that engines having two, three, six or other numbers of cylinders may utilize the same principles. In an exhaust system for use with four cylinders, typically pairs of the exhaust pipes are generally axially aligned with one of the discharge pipes in a crossing pattern. This has been found to be especially effective in four cylinder engines where a first cylinder has already discharged the exhaust gas thereof to the exhaust system and still has the exhaust valve thereof open when the exhaust valve of a second cylinder opens. In addition, near the end of the cycle of the first cylinder when the discharge valve is about to close the intake valve may be open such that there is an overlap wherein both valves are open at the same time.

A silencer mechanism is also provided for each of the discharge pipes. The silencer mechanism comprises an impedance tube mounted in the free or distal end of each discharge pipe and having a reduced cross-sectional area as compared to the discharge pipe at that location. The end of the discharge pipe between the impedance tube and discharge pipe is sealed. A deflection plate is mounted on the interior of the discharge pipe at a distance spaced from the end of the discharge pipe and the impedance tube. The deflector plate blocks straight-through flow from entering approximately one-half of the impedance tube. Preferably, the distance between the end of the discharge tube and the deflecting plate is such that gas deflected by the plate, especially after having impinged on the end wall of the discharge pipe and then reentered the gas stream with the remaining non-deflected gas, is approximately 180° out of phase in vibration or oscillation (related resonance frequency) with such remaining gas so that vibrations in the two gas streams tend to cancel one another and reduce the noise in the combined gas stream emitted from the discharge pipes.

The drawings constitute a part of this specification and include exemplary embodiments of the present invention and illustrate various objects and features thereof.

DETAILED DESCRIPTION OF AN EMBODIMENT OF THE INVENTION

Figure 1:
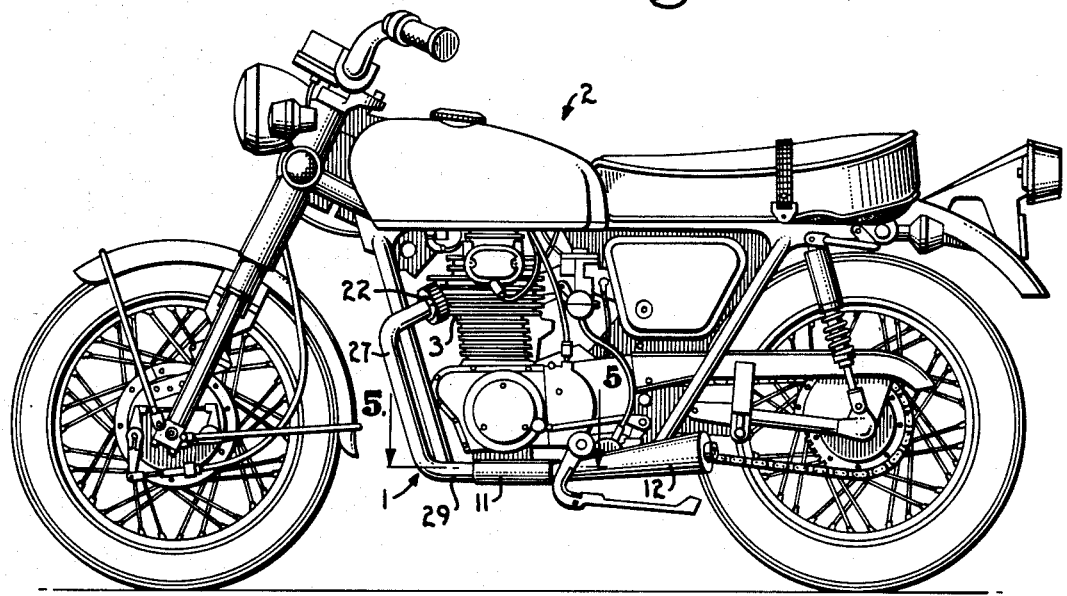
FIG. 1 is a side elevational view of a motorcycle having an internal combustion engine and an exhaust system according to the present invention.
Figure 2:
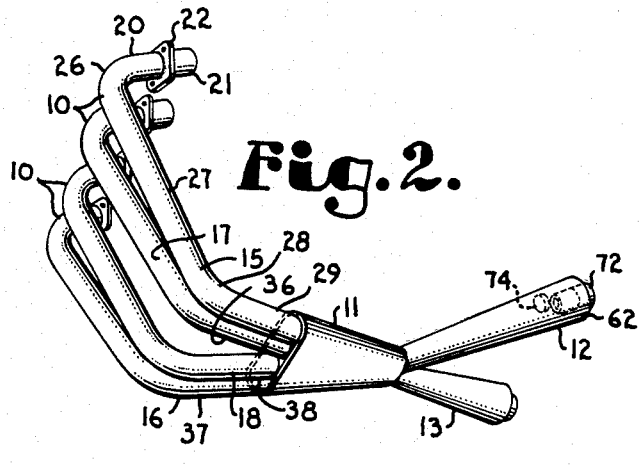
FIG. 2 is an enlarged perspective view of the exhaust system showing exhaust pipes, a collector, and discharge pipes, showing internal portions of a silencer in phantom.
Figure 3:
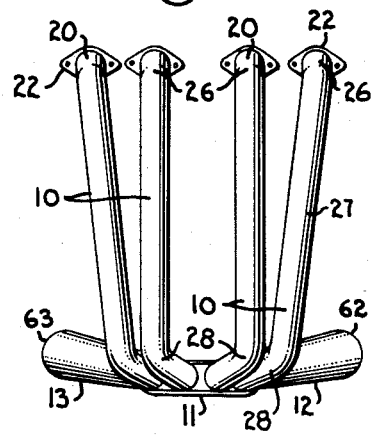
FIG. 3 is an enlarged front end view of the exhaust system.
Figure 4:
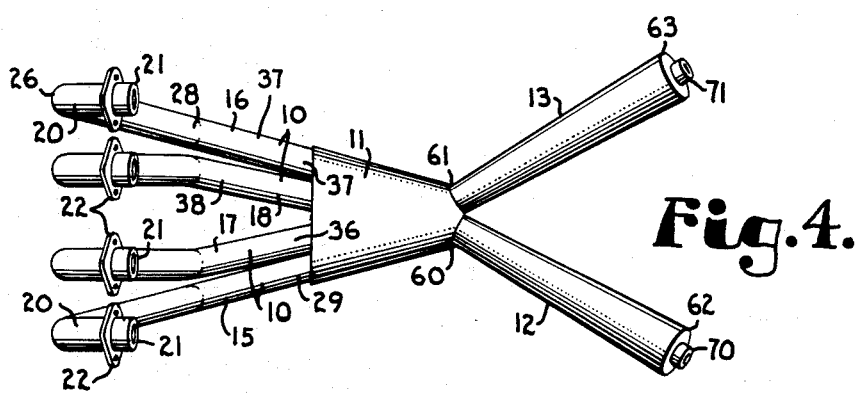
FIG. 4 is an enlarged top plan view of the exhaust system.

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally designates an exhaust system mounted on a motorcycle 2 having an internal combustion engine 3. The exhaust system 1 comprises a plurality of exhaust pipes generally designated by the reference numeral 10, a cross-flow collector 11, a first discharge pipe 12 and a second discharge pipe 13.

In the embodiment shown, there are four exhaust pipes 10 in particular two outer exhaust pipes 15 and 16 and two inner exhaust pipes 17 and 18. Each of the exhaust pipes 10 have a similar configuration and are of substantially the same length. As an example, outer exhaust pipe 15 has an upper neck 20 having an end 21 associated therewith which opens to the interior of the pipe 15. A manifold clamp 22 surrounds and is secured by welding or the like to the neck 20 and secures the exhaust pipe 15 to the engine 3 with suitable bolts or the like passed through the clamp 22. The end 21 is received by the exhaust port of the engine 3. The interior of the exhaust pipe 15 communicates with a single exhaust port (not shown) on the engine 3 in a manner well known in the art. Continuing along the exhaust pipe 15 after the neck 20 is a bend 26 followed by a drop section 27 another bend 28 which thereafter directs the exhaust gasses therein both rearwardly and generally horizontally. Following the bend 28 is a convergent section 29 which is interiorly flow-connected to a port 35 in the collector 11. The exhaust pipe 17 has a convergent section 36 which is aligned generally parallel to convergent section 29 of exhaust pipe 15. Exhaust pipes 16 and 18 also have convergent sections 37 and 38 respectfully which are aligned generally parallel to one another but at somewhat acute angles to sections 29 and 36. Each of the sections 29, 36, 37 and 38 are also slightly angled with respect to a longitudinal axis of the collector 11, each diverging at about the same angle from the axis but with sections 37 and 38 on opposite sides of the axis from section 29 and 36.

Figure 5:
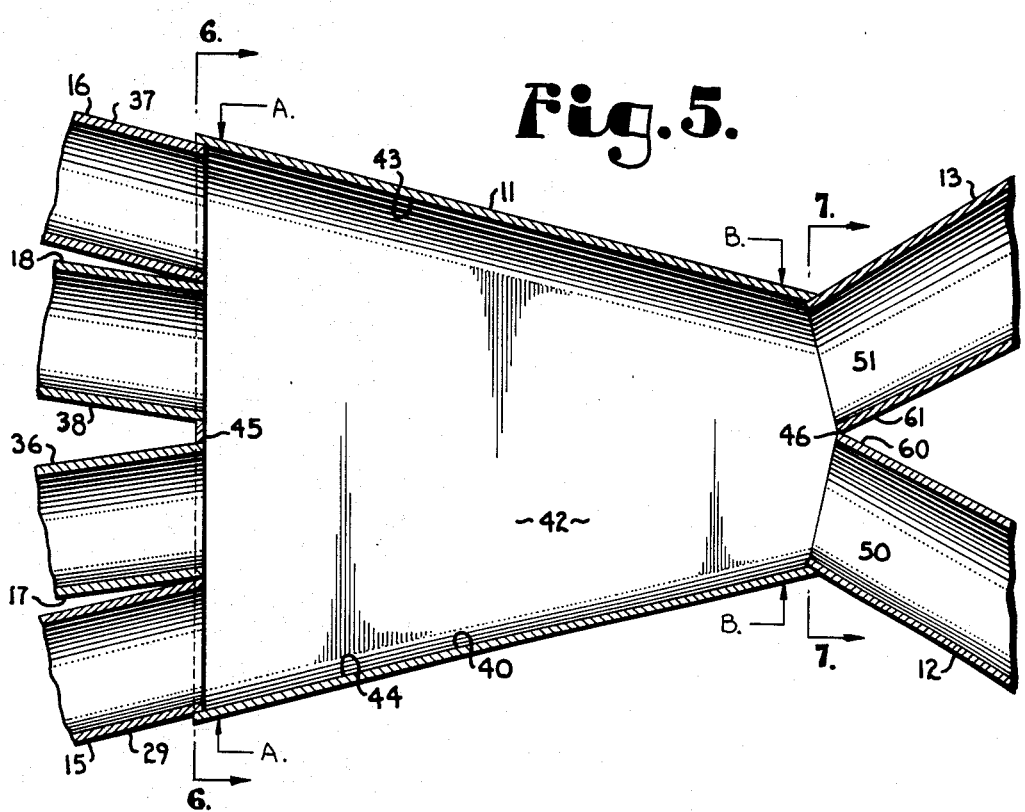
FIG. 5 is a further enlarged and partial cross-sectional view of the exhaust system, especially detailing the collector, taken along line 5—5 of FIG. 1.
Figure 6:
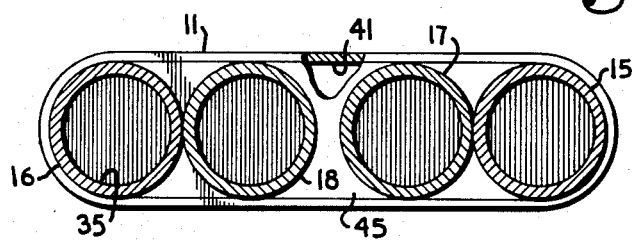
FIG. 6 is an enlarged cross-sectional view of the exhaust system taken along line 6—6 of FIG. 5, with portions broken away to show interior detail thereof.
Figure 7:
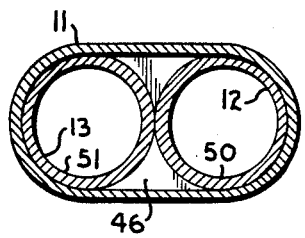
FIG. 7 is an enlarged cross-sectional view of the exhaust system taken along line 7—7 of FIG. 5.

The collector 11 defines an interior chamber 40, as seen in FIG. 5. The chamber 40 includes a top wall 41, bottom wall 42, sidewalls 43 and 44 and a front end wall 45 and a rear end wall 46. The chamber rear end wall 45 has apertures, such as collector port 35, for each of the exhaust tubes 15, 16, 17 and 18 passing therethrough. The lateral cross-sectional area of the chamber 40 near the exhaust pipes 15, 16, 17 and 18, as indicated by the letter A in FIG. 5 is substantially greater than the cross-sectional area of any one of the exhaust pipes and also the lateral cross-sectional area of the chamber 40 near an opposite end thereof associated with the discharge pipes 12 and 13 and indicated by the letter B in FIG. 5. The chamber upper wall 41 and lower wall 42 are generally trapezoidal-shaped having their bases secured to the front end wall 45. The chamber side walls 43 and 44 generally converge toward 12 one another and toward the central axis of the collector 11 from the front end wall 45 to the rear end wall 46 while maintaining a relatively constant height therealong.

The illustrated chamber 40 has no internal baffles or other substantial internal restrictions. The chamber 40 top wall 41 and bottom wall 42 smoothly and sealably are joined with the side walls 43 and 44 of opposite sides thereof in a rounded and streamlined manner. The chamber rear end wall 46 includes ports 50 and 51 therethrough which respectfully flow communicate with interiors of the discharge pipes 12 and 13.

The discharge pipes 12 and 13 are connected at a first end 60 and 61 respectively thereof and each have a second end 62 and 63 respectively which opens into the ambient air. The discharge pipes 12 and 13 flair or diverge outwardly from each other from the collector 11 and are generally symmetrically positioned about the central axis passing longitudinally through the collector 11. The discharge pipe 12 has an axis which is generally coaxial with the axes Of exhaust pipes 16 and 18. It is noted that these axes cannot be exactly coaxial since there are two exhaust pipes which cannot be overlapped, however, the axes are generally made as coaxial as possible. Likewise, the discharge pipe 13 is generally coaxial with the exhaust pipes 15 and 17. In addition, the axes of the discharge pipes 12 and 13 cross in a generally planar fashion within the collector chamber 40. The discharge pipes 12 and 13 each diverge outwardly from their first ends 60 and 61 to their second ends 62 and 63, respectively. It has been found that when the angle of divergence with respect to the axis of each discharge tube is approximately 3° a satisfactory ratio of the diameter of the first end 60 and 61 to the second ends 62 and 63 respectfully is in the nature of about 1.5 to 2.5.

Figure 8:
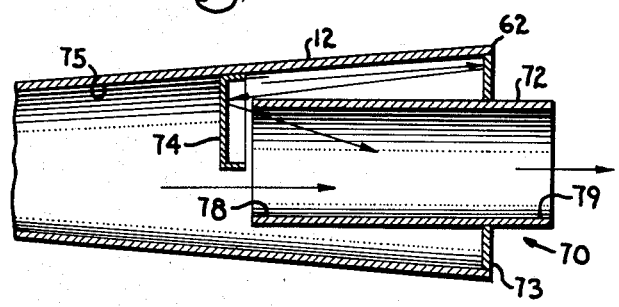
FIG. 8 is a partial and enlarged side elevational view of a distal end of one of the discharge pipes, with portions removed to show interior detail thereof.

Each of the discharge pipes 12 and 13 includes a silencer 70 and 71, respectfully. The silencers 70 and 71 are essentially identical and detail of silencer 70 is shown in FIG. 8. The silencer 70 comprises an impedance tube 72 mounted by end plate 73 in the discharge pipe distal end 62 and a deflection plate 74 mounted on an interior wall 75 of the discharge pipe 12. The impedance tube 72 is mounted generally coaxial with the discharge pipe 12 and the end plate 73 prevents flow from exiting the discharge pipe 12 except through the impedance tube 72. The deflector plate 74 is mounted generally perpendicular to the axis of the discharge pipe 12 so as to block from flow passing straight through the discharge pipe 12 approximately one-half of an interior opening, bore or passage 78 of the impedance tube 72. The deflector plate 74 is spaced from an end 79 of the impedance tube 72. The deflector plate 74 is also spaced from the discharge pipe end plate 73 a distance which is determined by the resonance frequency of the gasses discharged by the particular motorcycle engine. Such a distance is often emperically found for a given motorcycle engine. But it is theoretically positioned such that at least part of the gas that is deflected from passing straight through the impedance tube 72 is directed to impinge upon the end plate 73 and thereafter deflect off the deflector plate 74, or back into the gas stream, and is harmonically 180° out of phase with vibrations within the gas stream. In this manner, a certain amount of the noise which would exist without the silencer 70 is dampened so as to reduce the decibel level associated with the system 1.

In use, when the motorcycle engine 3 is operating, pulses of gas at relatively high temperature and pressure are discharged from the engine into the exhaust pipes 12 and 13. The gas pulses traverse the interior of the exhaust pipes 10 and pass into the collector chamber 40 and thereafter pass into and through the discharge pipes 12 and 13 to the atmosphere surrounding the motorcycle 2. When the system 1 is installed on a motorcycle 2, only the discharge end 62 and 63 of the discharge pipes 12 and 13 are open to the ambient air with the rest of the interior of the system 1 being sealably flow interconnected.

It is to be understood that while certain forms of the present invention have been illustrated and described herein, it is not to be limited to the specific forms or arrangement of parts described and shown.

What is claimed and desired to be secured by Letters Patent is as follows:

1. An exhaust system for an internal combustion engine having a plurality of exhaust ports; said system comprising:
   (a) a plurality of exhaust pipes; each exhaust pipe adapted to be connected to one of said exhaust ports so as to allow flow of exhaust gas from said ports into respective exhaust pipes;
   (b) structural means defining a collector chamber connected to and flow communicating with each of said exhaust pipes;
   (c) a first discharge pipe opening into the ambient air and connected to and flow communicating with said chamber at a location spaced from and generally coaxially aligned with a first of said exhaust pipes; and
   (d) a second discharge pipe opening into the ambient air and connected to and flow communicating with said chamber at a location spaced from and generally coaxially aligned with a second of said pipes; said first and second discharge pipes being aligned such that the axes thereof cross within said chamber.

2. The system according to claim 1 wherein:
   (a) each of said exhaust pipes have a substantially equal lateral first cross-sectional area associated therewith; and
   (b) said chamber has a laterally positioned second cross-sectional area associated therewith located near said exhaust pipes and a laterally positioned third cross-sectional area associated therewith located near said discharge pipes; said second cross-sectional area being substantially greater than either of said first or third cross-sectional areas.

3. The system according to claim 1 wherein:
(A) said plurality of exhaust pipes comprise first, second, third and fourth individual exhaust pipes of approximately equal length;
(b) each of said exhaust pipes is substantially connected to a first side of said collector chamber and each of said discharge pipes are connected to a second side of said collector chamber opposite said first side;
(c) said first and third exhaust pipes are generally aligned with said first discharge pipe along a first axis and said second and fourth exhaust pipes are generally aligned along a second axis with said second discharge pipe whereat each pipe is connected to said collector;
(d) said first and second axes cross within said collector chamber; and
(e) said first and second discharge pipes diverge in a relatively uniform manner away from the connection of each discharge pipe to said collector chamber.

4. The system according to claim 3 wherein: (a) said collector chamber converges relatively uniformly from said first end to said second end thereof.

5. The system according to claim 3 wherein:
(a) each of said exhaust pipes have a laterally positioned substantially equivalent first cross-sectional area associated therewith; and
(b) said chamber has a laterally positioned second cross-sectional area associated therewith located near said exhaust pipes and a laterally positioned third cross-sectional area associated therewith located near said discharge pipes; said second cross-sectional area being substantially greater than either of said first or third cross-sectional areas.

6. The system according to claim 1 wherein:
(a) each of said discharge pipes includes a silencer;
(b) each of said silencers comprises an impedance tube mounted coaxial with an associated discharge pipe and a deflector plate mounted in the associated discharge pipe spaced from and partly occluding direct flow of gas through the impedance tube; and
(c) said deflector plate being positioned in an associated discharge pipe such that a gas flowing through such a discharge pipe is split into a first portion passing directly through and a second portion which is reflected back for mixing with said first portion but in such a manner that the pressure fluctuation of said first and second portions are 180° out of phase with one another whereby noise associated with the gas exiting such a discharge pipe is reduced.

7. An exhaust system for use with a motorcycle having an internal combustion engine, said exhaust system comprising:
(a) first and second sets of exhaust pipes; each of said exhaust pipes having a first end and a second end; each of said first ends being adapted to be respectively connected to a cylinder exhaust port associated with the engine; said exhaust pipes being of substantially equal length;
(b) a collector having an inlet end, an outlet end, side walls, and top and bottom walls defining a central cross-flow chamber; said collector side walls generally converging from said inlet end to said outlet end; said collector inlet end and outlet end each having a plurality of openings;
(c) said exhaust pipe second ends being in flow communication with respective collector inlet end openings;
(d) first and second sets of the discharge pipes; each of said discharge pipes having a first end and a second end; each of said discharge pipe first ends being in flow communication with respective collector outlet end openings; each of said discharge pipe second ends exhausting into the surrounding atmosphere;
(e) said exhaust system being generally symmetrical about a longitudinal center line of said collector;
(f) said first set of said exhaust pipes being connected to said collector on a first side of the center line and at an acute angle with respect thereto;
(g) said second set of said exhaust pipes being connected to said collector on a second side of the center line and at an acute angle with respect thereto; said second exhaust pipe set acute angle being substantially equal to said first exhaust pipe set acute angle;
(h) said first discharge pipe set being connected to said collector on the first side of the center line and at an acute angle with respect thereto;
(i) said second discharge pipe set being connected to said collector on the second side of the center line and at an acute angle with respect thereto; said second discharge pipe set angle being generally equal to said first discharge pipe set angle, whereby the exhaust from said first set of exhaust pipes is directed to enter said collector and exit therefrom through said second discharge pipe set and the exhaust from said second set of exhaust pipes is directed to enter said collector and exit therefrom through said first set of discharge pipes.

8. The system according to claim 7 wherein:
(a) each set of exhaust pipes includes two exhaust pipes; and
(b) said discharge pipes diverge generally uniformly from an axis thereof between the first and second ends thereof.

9. In combination:
(a) a motorcycle having an internal combustion engine with a plurality of cylinders and associated cylinder exhaust ports; and
(b) an exhaust system for use with said motorcycle to relatively increase the horsepower associated therewith; said exhaust system including:
(1) a plurality of spaced exhaust pipes; each exhaust pipe having a first end mounted with respect to said engine to receive gaseous flow from a respective cylinder exhaust port and a second end;
(2) a cross-flow collector having generally parallel inlet and outlet ends; said collector having side walls which converge inwardly from said inlet end to said outlet end; said collector having an inner chamber generally free of internal restrictions and defined by said end and side walls and a top and a bottom wall;
(3) said exhaust pipe second ends being operatively flow connected to said collector chamber;
(4) a plurality of megaphone-shaped discharge pipes; said discharge pipes each having a first end and a second end; said discharge pipe second ends having a cross-sectional diameter substantially greater than the cross-sectional diameter of said discharge pipe first ends;

(5) each of said discharge pipe first ends being operatively connected to said collector outlet ends and generally aligned with a oppositely disposed portion of one of said exhaust pipes whereby an exhaust pulse of an associated exhaust pipe is directed to travel across said collector chamber and exhaust through said associated oppositely disposed discharge pipe.

10. An exhaust system for use with a motorcycle having an internal combustion engine with at least one cylinder; said exhaust system comprising:
(a) an exhaust pipe suitable for conveying a flowing gas therethrough and having first and second ends; said exhaust pipe being adapted to be connected at said first end to an exhaust port of an associated engine cylinder;
(b) a collector device having an internal chamber; said chamber having first and second ends; said chamber first end connected to and adapted for receiving gas flow from said second end of said exhaust pipe; said chamber first end having a cross-sectional area greater than a cross-sectional area of said chamber second end;
(c) a discharge pipe having a first end connected to and in flow communication with said chamber second end and a second end adapted to communicate with the surrounding atmosphere whereby exhaust gasses exit from the engine cylinder through said exhaust pipe into said collector chamber and therefrom subsequently through said discharge pipe into the surrounding atmosphere; said discharge pipe being generally shaped like a megaphone;
(d) said discharge pipe and said exhaust pipe being generally coaxially aligned; said collector chamber having a first section near said exhaust pipe which is relatively wide in cross-sectional area and a second section near said discharge pipe which is relatively narrow in cross-sectional area compared to said first section; and
(e) said chamber including communication means adapted to provide flow of gas between the surrounding atmosphere and said chamber; said communication means substantially not being coaxially aligned with said exhaust pipe so as to allow flow of air from the surrounding atmosphere into said chamber when a vacuum is formed in said chamber.

11. The exhaust system as set forth in claim 10 wherein:
(a) said engine has a plurality of cylinders;
(b) an exhaust pipe is provided for each of the engine cylinders; said exhaust pipes including a first group and a second group thereof;
(c) said discharge pipe is a first discharge pipe and said communication means comprises a second discharge pipe;
(d) said first exhaust pipe group is generally aligned with said first discharge pipe;
(e) said second exhaust pipe group is generally aligned with said second discharge pipe whereby exhaust gasses from said first exhaust pipe group are directed to exit through said first discharge pipe and exhaust gasses from said second exhaust pipe group are directed to exit through said second discharge pipe.

12. The exhaust system as set forth in claim 11 wherein:
(a) said first and second groups of said exhaust pipes are laterally spaced from a central axis of said collector chamber on opposite sides thereof with respect to said first and second discharge pipes respectively whereby a cross-flow of exhaust gasses is achieved.

13. The exhaust system as set forth in claim 10, wherein:
(a) said discharge pipe generally diverges from said first end to said second end such that a diameter of said second end is substantially greater than a diameter of said first end.

14. The exhaust system as set forth in claim 13 wherein:
(a) said discharge pipe first and second end diameters have a ratio associated therewith; and
(b) said ratio of said first end to said second end diameter is approximately 3:5.

* * * * *